United States Patent
Salt et al.

(10) Patent No.: US 7,047,752 B2
(45) Date of Patent: May 23, 2006

(54) COOLING SYSTEMS

(75) Inventors: Harry Salt, Burton-On-Trent (GB); Dennis Leslie Loveday, Loughborough (GB)

(73) Assignee: Loughborough University Innovations Limited, Leicestershire (GB)

( * ) Notice: Subject to any disclaimer, the term of this patent is extended or adjusted under 35 U.S.C. 154(b) by 0 days.

(21) Appl. No.: 10/398,513

(22) PCT Filed: Oct. 11, 2001

(86) PCT No.: PCT/GB01/04532

§ 371 (c)(1), (2), (4) Date: Apr. 11, 2003

(87) PCT Pub. No.: WO02/33326

PCT Pub. Date: Apr. 25, 2002

(65) Prior Publication Data

US 2004/0020220 A1  Feb. 5, 2004

(30) Foreign Application Priority Data

Oct. 14, 2000 (GB) .................................. 0225279.1

(51) Int. Cl.
*F28C 1/00* (2006.01)
*F28D 5/00* (2006.01)

(52) U.S. Cl. ........................... 62/121; 62/314; 62/315

(58) Field of Classification Search ................. 62/121, 62/314, 315, 259.4, 101, 107; 607/104, 107
See application file for complete search history.

(56) References Cited

U.S. PATENT DOCUMENTS

| | | | |
|---|---|---|---|
| 2,990,696 A * | 7/1961 | Fisher | 62/314 |
| 3,275,074 A * | 9/1966 | Campbell et al. | 165/166 |
| 4,002,040 A | 1/1977 | Munters et al. | |
| 4,977,753 A | 12/1990 | Maisotsenko et al. | |
| 5,187,946 A * | 2/1993 | Rotenberg et al. | 62/314 |
| 5,315,843 A * | 5/1994 | Morozov et al. | 62/309 |
| 5,727,394 A | 3/1998 | Belding et al. | |
| 5,800,595 A * | 9/1998 | Wright | 95/288 |

FOREIGN PATENT DOCUMENTS

| | | |
|---|---|---|
| DE | 197 37 525 | 3/1999 |
| WO | 87/01180 | 2/1987 |
| WO | 98/51972 | 11/1998 |

* cited by examiner

*Primary Examiner*—Chen Wen Jiang
(74) *Attorney, Agent, or Firm*—Jacobson Holman PLLC

(57) ABSTRACT

Cooling of an enclosed space is effected by a cooling system including a plurality of cooling units forming ducts having an internal surface on which a layer of liquid is developed, e.g. by a wicking material, and through which air from the enclosed space is passed in contact with the liquid layer whereby the liquid is exposed to and evaporates into the air-flow with consequent cooling of the duct wall on which the liquid layer is developed.

20 Claims, 7 Drawing Sheets

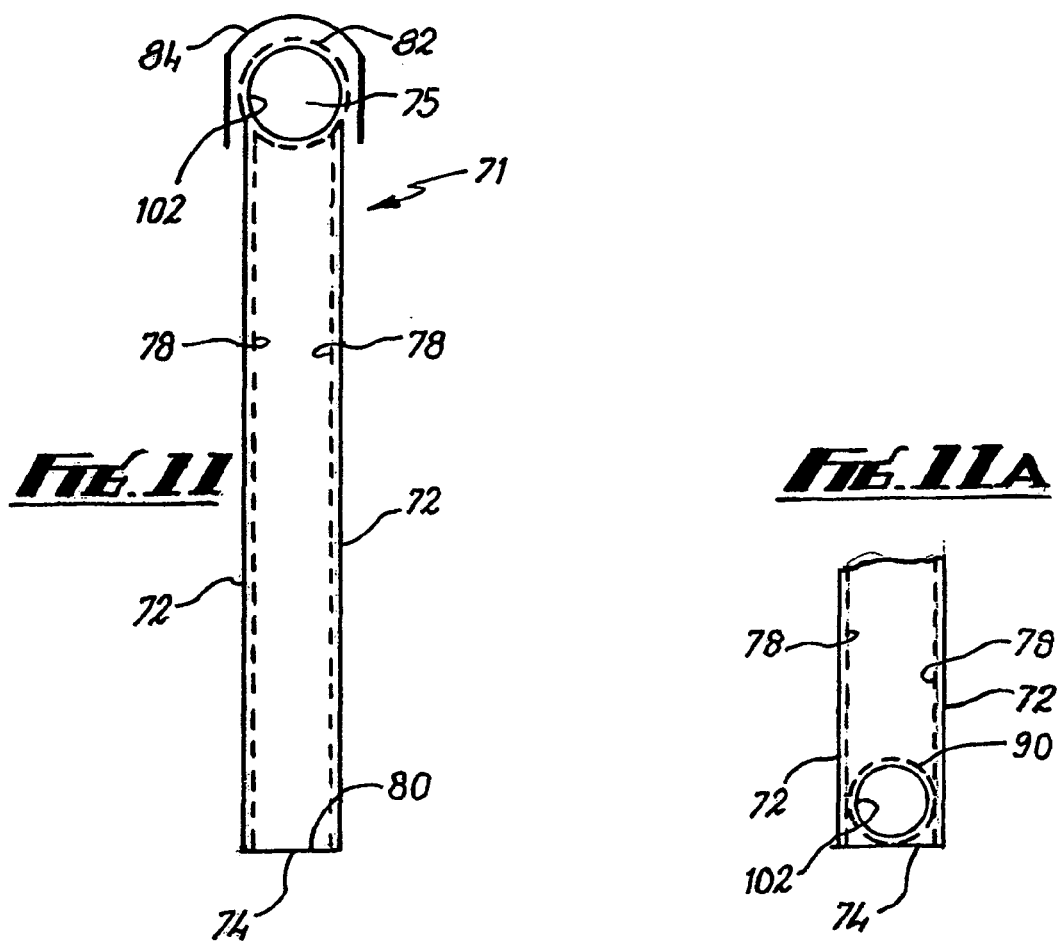
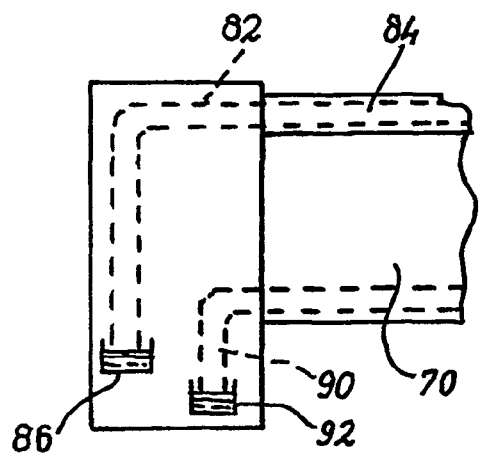

COOLING SYSTEMS

This application is the national phase under 35 USC §371 of PCT International Application No. PCT/GB01/04532 which has an International filing Date of Oct. 11, 2001, which designated the United States of America and was published in English and claims priority from 0025279.1 filed Oct. 14, 2000 in Great Britain which is claimed herein.

FIELD OF THE INVENTION

This invention relates to systems for cooling an enclosed space, for use for example in air conditioning and displacement ventilation systems.

BACKGROUND OF THE INVENTION

Air conditioning, radiant surface and displacement ventilation systems are used in enclosed spaces such as buildings, vehicles and equipment trailers, to provide cooling for equipment and thermal comfort for people. This is achieved by providing an adequate flow of air to the enclosed space with the air supply, when necessary, having been cooled and dehumidified; a typical state for the supplied air could be 13° C. and 65% relative humidity. In conventional systems, the thermal load of the space is dissipated entirely by using sensible heat transfer into the air stream and this determines the required air flow rate for the space; a typical state for the air leaving the space could be 24° C. and 35% relative humidity.

The low value of the relative humidity in the exhaust air represents an unused cooling potential that can be used, via latent heat transfer, to substantially increase the capacity of the air stream to remove thermal energy from the space. This potential cannot be realised by direct evaporation into the space because the increased humidity would reduce the comfort condition for occupants and any wet surfaces could represent a hazard with electrical equipment.

SUMMARY OF THE INVENTION

It is an objective of the present invention to utilise the extra cooling potential of the low relative humidity exhaust air from an air conditioned or ventilated space to increase the thermal energy removed from the space.

According to one aspect of the present invention there is provided a cooling system for an enclosed space comprising: a ceiling, floor or wall (hereinafter referred to as "surface structure") bounding the enclosed space, means for developing a layer of liquid on a face of the surface structure remote from the space, and means for exhausting air from the space and passing the exhausted air over said remote face so that, in use, the exhaust air effects evaporation of liquid from said layer into the air flow.

In this manner, cooling of the surface structure is effected thus allowing thermal energy to be extracted from a space bounded by such structure.

Preferably means is provided for replenishing the layer of liquid as it evaporates. Means may also be provided for collecting excess liquid.

The liquid layer is preferably developed using a layer of wicking material which may be in sheet form.

The layer of wicking material may be a single continuous layer or it may comprise a number of separate sheets, at least some of which may be interconnected with each other. Where the wicking material is sub-divided into a number of separate sheets, at least some of the sheets may share a common liquid feed and/or collector.

The wicking material will usually be in direct contact with said remote surface.

The surface structure may comprise a plurality of structural units which may be arranged in serial fashion and/or side by side fashion. The units may be of elongated configuration, viz. forming a strip-like unit. Not all of the structural units forming the ceiling or wall or other structure need be cooling units. For instance, the cooling function may be confined to one or more areas of the overall surface.

Each structural unit may include a further surface in spaced, opposed relation to said remote face to form an air flow path across said remote face. The air flow path may traverse the remote face from an inlet to an outlet of the unit.

The internal face of each cooling unit may be provided with a layer of wicking material and at least some of the cooling units may be interconnected so that liquid flow is conducted from one unit to the next. Also each cooling unit may include a chamber for discharge of air after passage over the liquid layer and such chambers of at least some of the units may be interconnected to form an air discharge duct.

According to a second aspect of the present invention there is provided a unit forming an air-flow channel and comprising a wall having internal and external faces, means for developing a layer of liquid on the internal face for exposure to and evaporation into the air-flow and means for supplying liquid to the liquid layer-developing means to maintain the internal surface wetted.

The unit may include a further surface in spaced, opposed relation to said internal surface to form an air flow path across said internal face. The arrangement may be such that the cross-sectional area of the air flow path over the wetted internal face varies in the direction of air flow, e.g. it may progressively reduce in the downstream direction.

Each unit may be provided with a liquid collector for collecting excess liquid from the unit The liquid supply and/or liquid collector may be adapted for connection to the corresponding supply and collector of other units, e.g. through male and female connectors.

The means for developing a liquid layer preferably includes a layer of wicking material provided on the internal face of the unit, e.g. a sheet of wicking material.

Liquid supply to and/or collection from the wicking layer may be by way of wicking element(s) associated with opposite edges of the wicking layer.

The wicking element(s) may be of greater cross-section than the layer of wicking material.

The unit may comprise a first lower chamber in which air flows over the liquid layer and a second upper chamber through which the air is exhausted after passage over the liquid layer.

According to a further aspect of the present invention there is provided a method of cooling an enclosed space bounded by at least one surface structure such as a wall or ceiling structure, said method comprising the steps of: developing a layer of liquid on a surface of said structure which is remote (viz external to) said space; removing air from the space and contacting the same with the liquid layer so that evaporation of liquid from the liquid layer into the air flow is secured thereby cooling said structure and hence the space bounded thereby.

The liquid may be water and an additive may be added to the liquid to inhibit microbial growth. The additive used to inhibit microbial growth may be sodium chloride or sodium hypochlorite.

Sea water may be used as the wetting liquid and the vapour entrained in the air flow may be collected and condensed for use as fresh water.

The invention will now be described by way of example only with reference to the accompanying diagrammatic drawings, in which:

BRIEF DESCRIPTION OF THE DRAWINGS

FIG. 11 is tnansverse sectional view of one of the ducts in FIGS. 9 and 10;

FIG. 11A is a fragmentary view corresponding to that of FIG. 11 but illustrating a modification;

FIG. 12 is a fragmentary view corresponding to part of the arrangement of FIG. 9 but illustrating another modification;

DETAILED DESCRIPTION OF THE PREFERRED EMBODIMENTS

Figure 1:
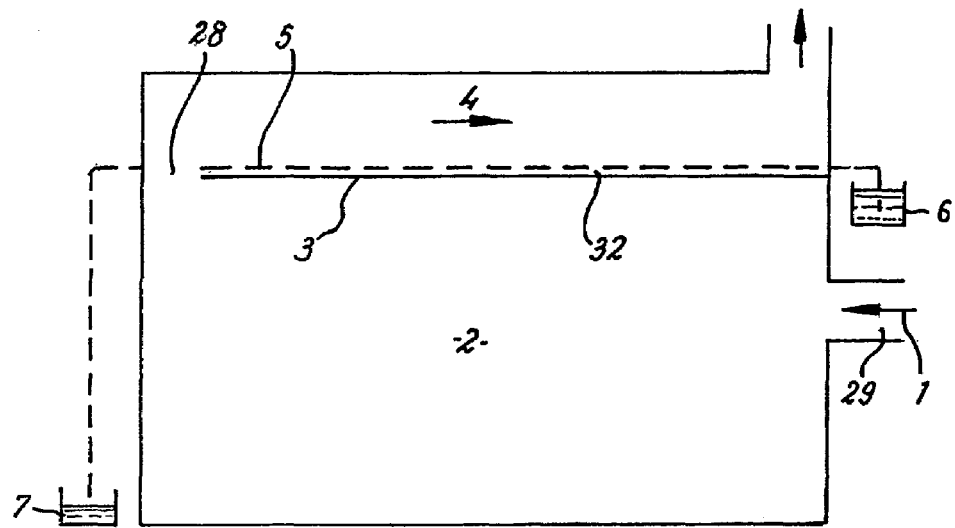
FIG. 1 shows a conditioned space provided with a cooling system in accordance with the invention.
Figure 2:
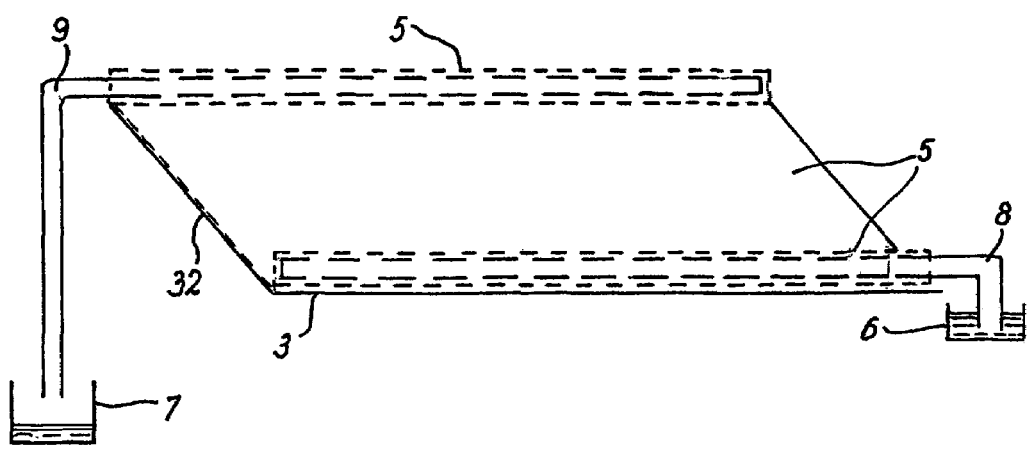
FIG. 2 shows one arrangement for feed and discharge of liquid to the system.

The invention is illustrated schematically in FIGS. 1 and 2 and is implemented in a false ceiling or wall that is dry on the side facing the conditioned or ventilated space to be cooled but wet on the face remote from that face, exhaust air from the space to be cooled being passed over the wetted surface so that evaporative cooling of the ceiling or wall is effected. Such evaporative cooling of the ceiling or wall in turn removes thermal energy from the conditioned or ventilated space, e.g. by radiation and convection heat transfer to the dry side of the false ceiling or wall.

Referring more specifically to FIGS. 1 and 2, cooled air 1 from an air conditioning system (not shown) enters space 2 through inlet 29 while warmer relatively low humidity exhaust air 4 from space 2 may at least in part be returned to the air conditioning system through outlet 28 via a passageway above the false ceiling 32. Alternatively the exhaust air 4 may be dumped. The lower face 3 of the false ceiling is presented interiorly of the space 2 while the upper face is remote from the space 2. The remote or upper face of the ceiling is maintained wetted by means of liquid (usually water, possibly with additives) supplied to a layer 5 of wicking material which extends over at least part of the ceiling (e.g. a major part thereof) in contact with the remote face of the ceiling 32. The wicking material may be any suitable material which is capable of developing a layer of liquid over the desired region of the ceiling, e.g. a fabric material such as cotton cloth.

Liquid is supplied to the layer 5 from a reservoir 6 via a supply feed 8 (see FIG. 2) which extends over a substantial dimension of the layer 5 from one end to the other. In FIG. 2, the feed 8 is located along one side of the layer 5 so that liquid is transferred into the layer 5 at that side and then traverses the width of the layer to the opposite side by capillary action. During such traverse, the liquid wets the layer 5 and hence the remote face of the ceiling thereby maintaining the latter constantly wetted. Part of the liquid is evaporated from the layer 5 by the flow of relatively warm, relatively low humidity exhaust air 4. The excess liquid reaching the opposite side of the layer 5 is drained by a collector 9 and routed into a container 7. The feed 8 and the collector 9 in the embodiment of FIGS. 1 and 2 are in the form of elongated elements of increased cross-section relative to the sheet of wicking material forming the layer 5 and may comprise a wicking material (e.g. the same wicking material as that constituting the layer 5). The feed 8 and collector 9 may each be formed for instance by tightly rolling or folding a strip or sheet of wicking material to produce a thicker cross-section than the layer 5. The feed 8 and collector 9 are suitably contacted or connected with the respective sides of the layer 5 to ensure uninterrupted flow into and from the layer 5.

The excess liquid collected in the container 7 may be disposed of or returned to reservoir 6 for re-use. Supply reservoir 6 is connected to a water supply (not shown) to maintain a head of water. A water level controller such as a ball-cock arrangement may be used to control the flow of water into supply reservoir 6. The collector 9 terminates at a point below the liquid level in supply reservoir 6 and allows drips to be collected in container 7. The flow rate of water through wicking layer 5 is then determined by the difference in height between the liquid level in supply reservoir 6 and the end of exhaust pipe 9 above collection container 7, together with the hydraulic resistance through the complete structure. Water in reservoir 6 is maintained at a level below the level of wicking layer 5 distributed across false ceiling 32 and this prevents the possibility of any drips forming on lower ceiling surface 3. Alternatively, reservoir 6 may be placed above ceiling wick 5 if, for instance, ceiling 32 is designed to prevent dripping and the liquid flow rate is controlled to lie within the flow rate capacity of wicking layer 5.

The arrangement thus far described is particularly suitable for the case where the liquid includes a soluble solid additive (e.g. a biocide such as NaCl). Where no such additive is used or if the additive is liquid, e.g. a liquid biocide, such that there is no risk of crystallisation of the solute, the collector 9 and the container 7 may be omitted.

In use, dehumidified cooled air 1 is introduced through inlet 29 into the air-conditioned or ventilated space 2 underneath the false ceiling 32. Exhaust air 4 from space 2 passes over the layer 5 which maintains the upper or remote face of the ceiling constantly wet while the lower face 3 of the ceiling remains dry. The state of cooled air 1 entering the space 2 is typically 13° C. and 65% relative humidity and that of exhaust air 4 as it leaves space 2 is typically 24° C. and 35% relative humidity. Water evaporates from the layer 5 into exhaust air 4, thereby cooling the false ceiling 32 through contact between the layer 5 and the upper face of the ceiling. As a result, the cooled false ceiling 32 extracts thermal energy from conditioned space 2, e.g. by radiation and convective heat transfer.

Water in reservoir 6 is typically at room temperature and all additional cooling is provided by evaporation of water from the wicking layer 5. This is in contrast to conventional chilled ceilings, which require separate chilled water units to supply water at about 12° C. or less. Conventional cooling panels, such as those used for chilled ceilings, require the use of low water temperatures and materials of high thermal conductivity because the thermal energy flow path is long and the flux is concentrated as it travels through the panel from the space to the cooling water. In the cooling system of this invention, the thermal flux may remain at a substantially uniform density and the flow path from the space 2 to the evaporating water may be short so that materials of low thermal conductivity and cost, such as plastic, can be used for construction. The condensation formed on the pipes carrying the chilled water in conventional cooling panels also causes a problem and means have to be found to deal with the condensation to avoid drips into the space being cooled.

Figure 3:
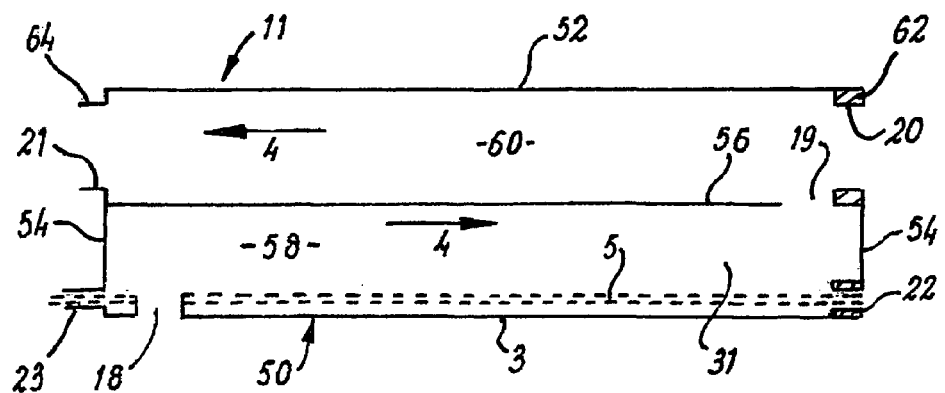
FIG. 3 is a longitudinal section of a ceiling tile which forms part of one form of cooling system in accordance with the present invention.

In FIGS. 1 and 2, the wicking layer 5 is shown as a single continuous sheet extending over a substantial part of the ceiling. In the embodiment of FIG. 3, the wicking layer 5 is effectively sub-divided into a number of smaller areas by for instance embodying the arrangement within ceiling tiles used to construct the false ceiling. FIG. 3 illustrates one such tile unit or module and it will be understood that the ceiling as a whole or at least one or more regions thereof may be constructed using such tiles which will be substantially of identical construction and appearance and may be produced from appropriately rigid plastics material. The illustrated tile 11 is generally of box-section and has a bottom wall 50, the lower surface 3 of which, in use, is exposed to the space being cooled (i.e. space 2 in FIG. 1). On its interior surface (viz. the surface remote from the space 2 to be cooled), the wall 50 is provided with a layer 5 of wicking material so that a layer of liquid can be developed across the remote surface internally of the tile.

The tile 11 has a top wall 52 spaced above the bottom wall 50 with front, rear and side walls 54 extending between the bottom and top walls 50, 52. The front and side walls 54 are not illustrated. An intermediate wall 56 is located between the top and bottom walls and divides the interior of the tile into a lower chamber 58 and an upper chamber 60. Air is admitted from space 2 via an inlet or inlets 18 and the chambers 58, 60 are interconnected by one or more apertures 19 so that air can flow from lower chamber 58 after passage over the wicking layer 5 into the upper chamber 60. The upper chamber is provided with openings 20 and 21 at opposite ends thereof. These openings are of complementary configuration so that two tiles can be fitted together in sealed fashion with the opening 20 of one tile in registry with the opening 21 of an adjacent tile. Thus, the openings may be arranged to interconnect by way of male and female connector formations such as depicted by reference numerals 62, 64. In this manner, the upper chambers 60 of two or more tiles can be interconnected to form a continuous duct extending the length of the tiles which are so interconnected.

Continuity between the wicking layers 5 associated with each tile is achieved by means of male and female connectors 22, 23 so arranged that the connector 22, 23 of one tile sealingly engages with its counterpart on an adjacent tile. At one end of a row of tiles interconnected in this way, liquid is supplied by a feed arrangement to the inlet connector 22 so that a layer of liquid can be developed on the interior face of the lower walls 50 of the tiles. At the opposite end of the row, the outlet connector 23 is connected to a collector for removal of excess liquid. The feeder and collector will each be associated with a supply reservoir and container corresponding to those depicted by references 6 and 7 in FIGS. 1 and 2 and the arrangement will be such that the formation of drips on the lower face of the wall 50 is avoided, as described in relation to FIGS. 1 and 2.

Air flow from the space to be cooled is drawn into the tiles by connection of the downstream ends of the ducts to the air return duct of the air conditioning or ventilating system. Thus, air enters via inlets 18 of the tiles and passes from one end of the tile along the lower chamber 58 to the opposite end with consequent evaporation of liquid from the wicking layer and cooling of the lower wall 50. On reaching the opposite end, the air flow is routed through apertures 19 into the upper chamber and flows towards outlet opening 21 along with air entering that chamber through inlet opening 20 coupled with an upstream tile. The air collected in the duct formed by the upper chambers 60 of each row of tiles is discharged at the downstream end of the duct to the return duct of an air conditioning system. The inlet opening 20 at the upstream end of the duct formed will be closed or absent from the corresponding tile while the outlet opening 21 at the opposite end of the duct will be open for connection to an exhaust. Inlet 18 is not continuous across the width of ceiling tile 11 as this would disrupt the flow of liquid along wick 5.

Figure 5:
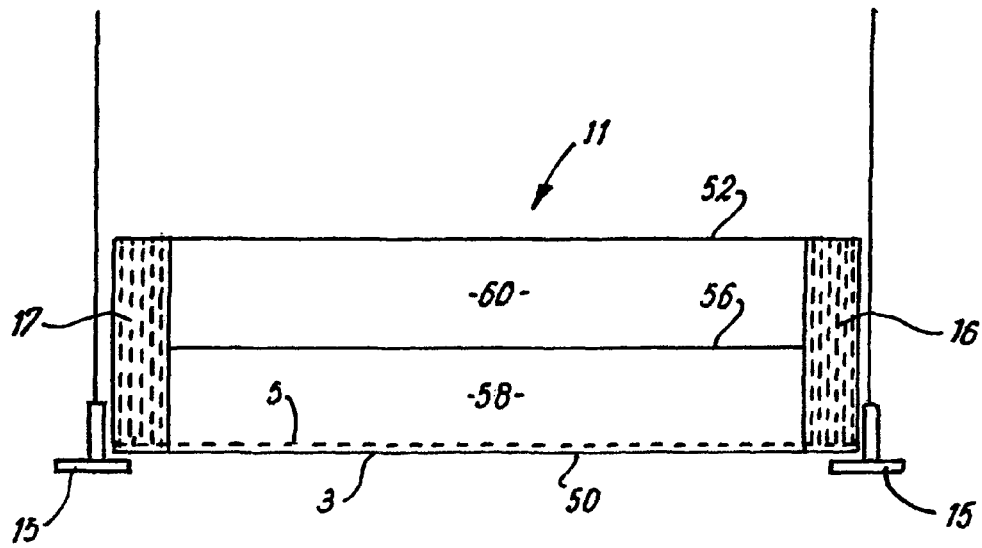
FIG. 5 is a cross section showing mounting of a ceiling tile within a suspended ceiling structure.

Tiles 11 can be placed directly onto T-bars as typically found in commercial buildings (see FIG. 5). In a modification, each tile unit or module 11 may be manufactured without the chamber 60; for instance, once the air has passed over the wicking layer 5 in each tile unit, it may be discharged directly to atmosphere or to a common air return duct or ducts or common plenum chamber separate from the tile units.

Figure 4:
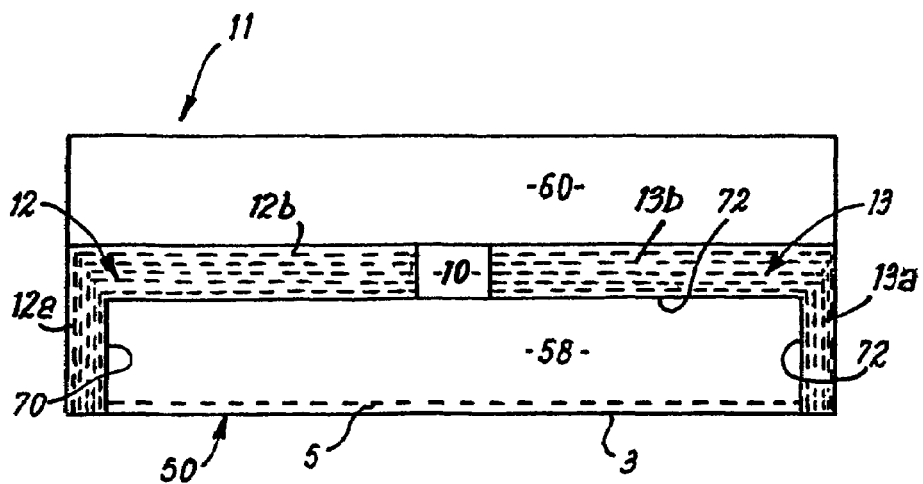
FIG. 4 is a cross section of a ceiling tile, showing a particular arrangement of the supply and collection wicks.

FIG. 4 illustrates one method of designing the feed and collector associated with the wicking layer in each tile unit. FIG. 4 is a cross-section perpendicular to direction of the flow of air. The liquid feed is in the form of a supply wick 12 connected to a supply reservoir (not shown) so that supply wick 12 wets wicking layer 5 at a location adjacent one edge thereof, supply wicks of adjacent ceiling tiles 11 being connected in serial fashion so as to provide a continuous wick extending along a row of tiles and feeding the wicking layers 5 associated with each of the tiles in the row. Connection of one feed or collector wick to the next may be achieved for example simply by arranging for their ends to contact when the tiles are butted up to one another. The collector wick 13 is connected to a drainage container and serves to drain each of the wicking layers 5 of a row of tile units, such drainage being effected at a location adjacent the opposite edges of the wicking layers to those edges connected to the supply wick 12. Supply wick 12 and collector wick 13 are separated from direct contact with each other by separator 10 and are arranged to extend both upwardly and in overlying relation with the bottom wall 50 so as to increase the cross-sectional area of the wicking material. The sections 12a, 12b and 13a, 13b of the wicks 12 and 13 extending upwardly and in overlying relation with the lower surface 3 are isolated from exposure to the exhaust air by intervening walls 70, 72. Walls 70 may be castellated at their lower edges or otherwise designed to permit contact between the wick 5 and wicks 12, 13 so as to maintain fluid flow continuity therebetween.

The embodiment of FIG. 5 is similar to that of FIG. 4 having a supply wick 17 and a collector wick 16 but in this case the wicks do not extend in overlying relation with the bottom wall 50. This embodiment illustrates how the tile units 11 may be mounted in a suspended false ceiling arrangement with each tile unit being supported around its perimeter by T-bars 15 of the suspended ceiling system.

Preliminary calculations indicate the following. If the evaporation rate from wicking layer 5 is 0.01 $g.s^{-1}.m^{-2}$, corresponding to a thermal load of approximately 25 $W.m^{-2}$, and the tiles 11 are 1 m long and 0.5 m wide, then the rate of evaporation from each tile 11 is 0.005 $g.s^{-1}$. If supply reservoir 6 is located at ceiling level and collection container 7 is located at floor level, the height from collection container 7 to reservoir 6 is approximately 2.5 m and the available forcing pressure for the system is approximately 25 kPa. If we consider a strip of ceiling tiles 11 0.5 m wide with supply wick 17 and exhaust wick 16 built into the sides of tiles 11 and of diameter 30 mm, the flow across tiles 11 will not be uniform but will be greatest through the tile 11 nearest supply reservoir 6 and least at a distance more than halfway along the strip from supply reservoir 6. The actual distance of the minimum flow depends upon the ratio of the mass evaporated to the total mass flow rate. If the mean flow through tiles 11 is twice the required flow for evaporation, thus limiting the concentration of any additives to the water, the minimum flow rate is at approximately 0.67 of the length of the strip from the supply end. If wick 5 is 1 mm thick and all wicks 5 have a permeability of $10^{-11}$ $m^2$, which is typical for many cloth fabrics, the forcing pressure of 25 kPa would ensure an adequate flow to all parts of a 5 m long strip of tiles 11. If tiles 11 were configured with supply wick 12 and collector wick 13 as in FIG. 4 and each had a cross-sectional area of 0.003 $m^2$, then-the strip of tiles 11 could be 10 m long.

Figure 6:
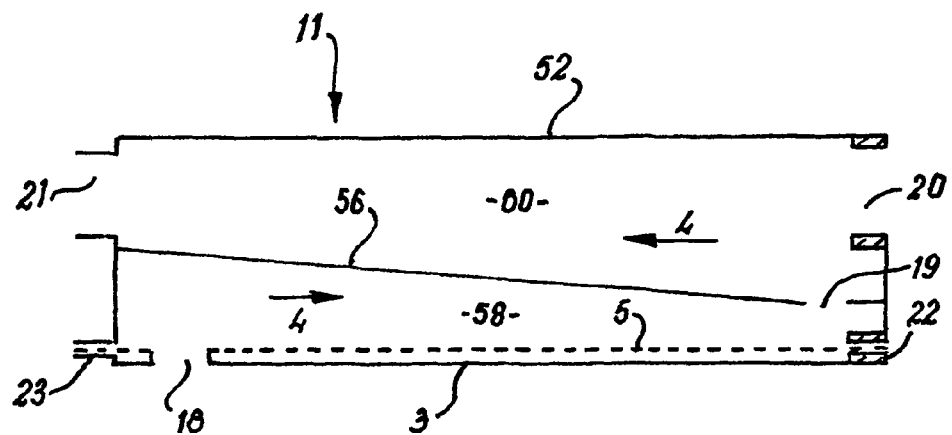
FIG. 6 illustrates a means of obtaining a uniform flux and temperature profile along a tile or ceiling.

It will be understood that exhaust air 4 becomes more humid as it flows from inlet 18 to outlet 19. Hence the heat transfer varies along tile 11 and consequently the temperature of the ceiling varies along each tile. A more uniform ceiling temperature can be obtained by suitably decreasing the height of the gap for exhaust air 4 as it travels along the tile from inlet 18 to outlet 19. Such an arrangement is implemented in the embodiment of FIG. 6 (which is a view corresponding to that of FIG. 3) in that the cross-section of the lower chamber 58 reduces from the inlet end towards the outlet end, i.e. by inclining the intermediate wall 56 in the manner shown.

Figure 7A:
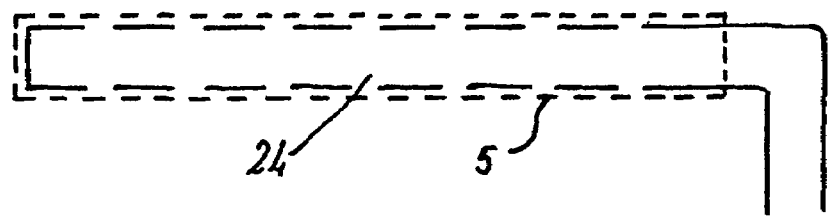
FIG. 7 illustrates alternative means of constructing supply and exhaust pipes.
Figure 7B:
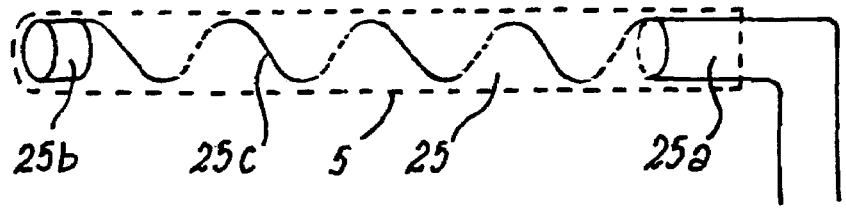

FIGS. 7A and 7B illustrate possible variations of the feeder/collector arrangements for the wicking layer 5 in which the water feed and collection is via a hollow pipe whereby the wicking layer 5 is wetted directly from the supply pipe rather than by capillary action through a wick such as the wicks 12, 13 shown in FIG. 4 for example. In such arrangements, it is important to ensure that the pipes are maintained filled with liquid so as to avoid air being drawn in and interrupting fluid flow.

In FIG. 7A, the feed/collector pipe 24 has a perforated wall and the wicking material 5 is wrapped in tubular fashion around the pipe so that the liquid supply passes through the perforations directly into the wicking material. The perforations are preferably provided at or in the lowermost regions of the wall of the pipe 24.

In FIG. 7B, the feed/collector pipe 25 comprises spaced apart first and second sections 25a and 25b with a spiral former 25c bridging the two sections so that the wicking material can be wrapped in tubular fashion around the assembly 25a, 25b, 25c with the former 25c supporting that section of the wicking material spanning the sections 25a, 25b. In each case, an edge portion of the wicking layer 5 is wrapped around the feed/collector pipe 24 or 25. Successive pipes 24, 25 associated with adjacent tile units may be coupled together via spigot and socket connections which may automatically engage and seal together when adjacent tiles are butted against one another. The wicking material wrapped around the pipes may be arranged to overlap when the successive pipes are interengaged, to afford fluid flow continuity therebetween.

These pipe arrangements, as shown in FIGS. 7A and 7B, will not self prime but can be filled simply by raising the water level in a reservoir at the time of commissioning the system. When the pipes are full of water, capillary forces in the wick will hold the water in place provided the distance from the bottom of the exhaust pipe to the highest point of the supply and exhaust pipes, is less than the height to which the wicks will raise water. A typical wicking height for cloth fabrics is 120 mm. Any ends of the wicks must be sealed onto the walls of the pipes to prevent air being drawn into the pipe between the wick and the supporting structure. Calculation has shown that the main pressure drop in this system is across the wick, and 6 mm pipes in a 20 m strip of tiles would require a head of water of only 30 mm for a supply water flow rate equal to twice the evaporation rate. This would allow the water level in the supply reservoir to be 20 mm below the ceiling with the end of the exhaust pipe approximately 60 mm below the uppermost point of the supply pipe, which is well within the wicking height of typical cloth fabrics.

It will be understood that where tile modules or units are used, they may be arranged in an array, e.g. a number of rows of tiles arranged side-by-side with each row forming an air flow duct. Common inlet and outlet headers may be associated with the array for routing air into and exhausting air from the ducts. Usually the air flow along one row of tile units will be separate from the air flow taking place in adjacent rows; however, we do not exclude the possibility of interconnections between the ducts associated with adjacent rows of tile units.

In a further modification of the invention, the units 11 may be of elongated configuration in the direction of air flow, i.e. of strip-like configuration. In this case, two or more strip units may be interconnected in a serial fashion so as to extend across the space to be cooled or a single such strip unit may span the space in one direction (i.e. the direction of air flow through the units) and there may be two or more such strip units located side-by-side so as to span the space in the direction perpendicular to the air flow direction. When the units are in strip form, they may be manufactured in long lengths with the wicking layer bonded to the bottom wall with liquid feed and collector wick sections or pipes attached in situ, if desired together with the upper chamber 60. This latter arrangement also applies to the case where the units are in the form of tiles, i.e. individual tiles may be provided with bonded wicking layers and/or in situ feed and collector wick sections or pipes.

Figure 8:
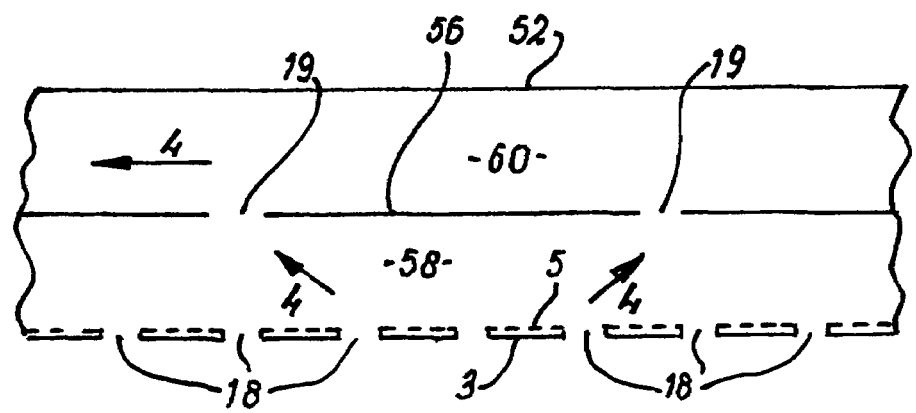
FIG. 8 illustrates a further embodiment of the invention.

In the embodiment shown in FIG. 8, instead of one or more inlets 18 being located at or adjacent one end of a tile unit, the tile unit may have inlets distributed at different points (extending through both lower wall 50 and the wicking layer 5) to allow exhaust air 4 to pass into the unit at a range of locations between opposite ends of the unit. Likewise the intermediate wall 56 may, if desired, be provided with outlets 19 distributed at various locations to provide an array of entry points from chamber 58 into chamber 60.

A numerical thermal model of the system has been developed and a small experimental model of the system has been built in the laboratory. The numerical model has been validated by comparing its results with those obtained from the laboratory experimental model. Simulations with the numerical model have shown that the electric power consumption for air conditioning in large commercial buildings can be significantly reduced if the cooling system of the present invention is installed, primarily because the air flow rate in the system can be substantially reduced with a corresponding reduction in power for pumping air through the cooling system and also reduction in compressor power.

Laboratory experiments with cotton wicks over a period of six months have shown that mould or fungal growth on the wick can be eliminated with saline solutions. Clearly, the proper use of appropriate fungicides could also ensure that the system remains uncontaminated. If a saline solution is used to prevent mould growth, it would also prevent legionella from contaminating the system because those bacteria require non-saline water to survive. Furthermore, since there is no spray associated with this system, there is no means for carrying legionella through the system. Mould growth would also be inhibited by the lack of light within the enclosed tiles and an open cell foam insert could be used to prevent any light entering via the inlet or inlets.

Since the ceiling in this system is wet, it would serve to inhibit the spread of fire. If the water level in the supply reservoir were increased when fire was present in the building, then the ceiling would be flooded and it could form an active part of the fire control system of the building—viz. the fire detection system may be linked to the water supply to the cooling system of the present invention so as to flood the normally wetted face of the cooling system in response to detection of a fire.

A 10% saline solution, which is similar to sea-water, has been used in the laboratory to inhibit the growth of mould. Since the air leaving a cooling ceiling system according to the present invention may be almost saturated, the system can be used to provide fresh water from sea water by desalination, for example in air-conditioned buildings. Sea water could be delivered to an air-conditioned building and distributed to the cooled ceiling system, and the refrigeration plant of the air-conditioning system could be used to condense the water vapour from the nearly saturated return air and thereby generate fresh water, effectively as a by-product. Calculations indicate that if the thermal load dissipated through the ceiling system were 28 W/m$^2$ of floor area, then the system would produce approximately 1 liter of fresh water per square meter of floor area for each 24 hour period of running.

In conventional air conditioning systems around 80% of the air is recycled within the system, the remainder being vented to the atmosphere. The present invention facilitates use in the same manner, but is also able to use 100% fresh air, i.e. with no recycling. As the use of recycled air has been linked with so called 'sick building syndrome' the ability to use 100% fresh air may be advantageous, e.g. for air quality purposes.

In the embodiments described thus far, the cooling surface comprises part of or forms a substantially uninterrupted wall structure (e.g. ceiling) bounding a space to be cooled. However, the bounding surface need not be uninterrupted; it may be formed by a number of spaced surfaces. Such spaced surfaces may collectively form a boundary of the enclosed space to be cooled. For example, they may form a false ceiling or overhead structure of slatted form. One embodiment which may be used in such circumstances is illustrated in FIGS. 9 to 15 to which reference is now made.

In this embodiment, a bank of spaced apart, generally parallel evaporating ducts 70 is mounted in overhead relation to the room or other space to be cooled, just below the roof 71. Each duct 70 comprises an elongate member of generally U-shaped section comprising generally vertically extending side walls 72 and a generally horizontal lower wall 74. The open upper end of each member is closed by a liquid supply arrangement 75 so that each duct 70 forms a channel for conducting air flow through the duct interior. At one end, each duct 70 is open so as to form an inlet for admission of air and at the opposite end it is connected to a common plenum chamber 76 which may be mounted in the space to be cooled or externally thereof The internal faces of the sides walls 72 are provided with a layer 78 of wicking material such as a cotton fabric so that a suitable liquid such as water can be wicked across the internal surfaces thereby developing a layer of the liquid in contact with and wetting such surfaces. Although not shown in FIG. 11, the lower wall 74 may likewise be provided with a layer or other structure of wicking material on the inner surface 80 to allow a layer of the liquid to be developed across the lower wall 74 although as mentioned below, it is not essential to do this. The wicking material 78 and on surface 80 will usually extend over substantially the fall length of each duct 70.

Liquid is supplied to the wicking structures 78 and on surface 80 (if present) by the arrangement 75 which in this case comprises a delivery tube 82 of wicking material over which a cover 84 is provided to prevent evaporation of liquid into the surroundings. The wicking tube 82 extends over substantially the entire length of the associated duct 70 so that there is a supply of liquid to the top edges of the wicking layers 78 along substantially the entire length of the duct. The tube 82 at one end dips into a liquid reservoir 86 and the arrangement is such that the highest open point on the liquid delivery tube 82 should not exceed the wicking height of the wick (typically about 150–200 mm).

Once the wicking tube 82 and the wicking structures 78 and on surface 80 have been primed with liquid, it will be seen that the walls 72 and 74 can be maintained continuously wetted while preventing dripping if the liquid level in the reservoir 86 is appropriately positioned, viz. below the lower edges of the vertically arranged wicking layers 78. There may be one reservoir 86 associated with each delivery tube 82 or a number of wicking tubes 82 may be serviced by a single reservoir 86, e.g. all of the wicking tubes 82 may be supplied by a single common reservoir 86.

In operation, air from the space to be cooled flows through ducts 70 from the inlet ends 77 thereof to the plenum chamber 76 from where it may be exhausted. The air flow is created by developing a pressure differential between the space to be cooled and the interiors of the ducts 70. This can be effected for example by means of a fan (not shown) connected to the plenum chamber 76 and arranged to suck air from the space to be cooled into the ducts, or it may be created by developing a positive pressure, which need only be relatively small, within the space to be cooled so that the resulting pressure differential is effective to induce the desired air flow. Air flow through the ducts 70 results in evaporation of liquid from the wicking structures 78 and on surface 80 thereby cooling at least the sides walls 72 and also the bottom wall 74 (if surface 80 is provided with wicking structure). These walls in turn serve to cool air circulating, e.g. vertically downwards (or upwards), past their external surfaces with consequent cooling of the space in which the cooling system is installed. The external air flow may be a forced flow, e.g. created by a blower or blowers, or it may be the result of natural circulation of the air.

Figure 9:
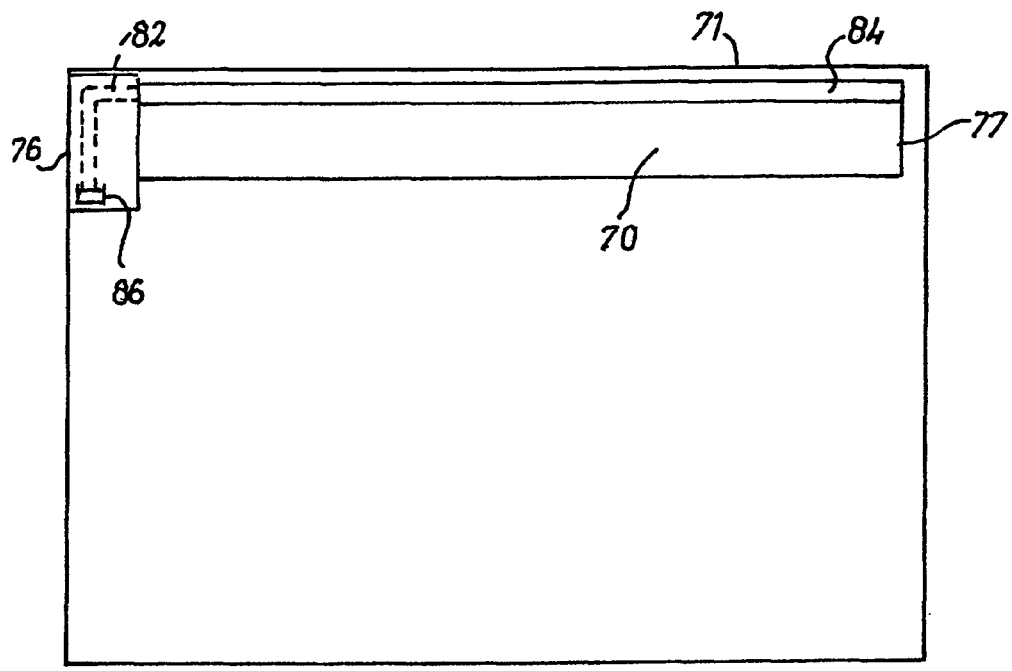
FIG. 9 illustrates another embodiment of the invention in which the cooling effect is achieved by means of one or more ducts.
Figure 10:
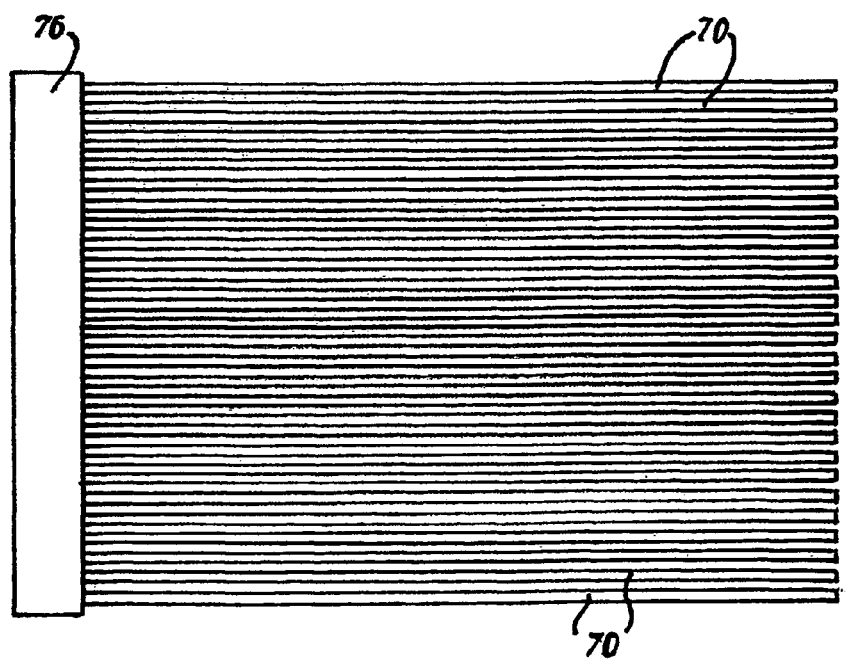
FIG. 10 is an overhead view of the plenum chamber and bank of ducts seen in FIG. 9.

The ducts may be fabricated from suitable plastics material or from metal. Where the lower wall 74 has a relatively small width compared with the height of the walls 72, the wicking layer or structure associated with wall 74 may be omitted without significantly affecting cooling power, even more so if the ducts 70 are fabricated from material having good thermal conductivity such as a suitable metal. Typical dimensions for the ducts 70 are:

Side walls 72—50 mm up to 200 mm, e.g. 100 mm
Bottom wall 74—6 to 24 mm, e.g. 12 mm
Pitch between adjacent ducts (centre line to centre line)—15 to 35 mm, e.g. 25 mm In FIG. 9, a single bank or array of ducts is illustrated; however, it will be appreciated that there may be more than one array of ducts having the same function disposed one above the other to give an increased thermal performance and/or to produce a desired visual effect. The arrangement may be such that the ducts in one array are substantially vertically aligned with those in the adjacent array(s) or the ducts in adjacent arrays may be staggered, for example so that the ducts in one array overlie the spaces in the adjacent array. In such an arrangement, each array may have to be provided with its own supply reservoir because of wicking height considerations.

The arrangement shown in FIG. 11 is suitable for situations where there is no risk of material precipitating from the liquid, e.g. water or water containing a liquid biocide. However, if there is a risk of such precipitation, as would be the case where the liquid incorporates a solid, soluble biocide (such as NaCl) or other additive dissolved therein, it may be desirable to ensure that crystallisation of the solute is prevented at the extremities of the wicking material, e.g. the lower edges of the layers 72. This may be achieved by providing a liquid collector at the bottom of each duct 70 which, as illustrated in FIG. 11A may be in the form of a wicking tube 90 arranged to collect and feed the liquid to a collection vessel 92 suitably arranged with its liquid level below the supply reservoir 86 (see FIG. 12). Liquid collected in the collection vessel 92 may be recycled to the supply reservoir 86. A single collection vessel 92 may service all of the collecting tubes 90 or more than one collection vessel 92 may be provided with each vessel servicing two or more collecting tubes 90. Although not illustrated in FIG. 11, there may also be a layer of wicking material on the internal surface of the wall 74.

Figure 13:
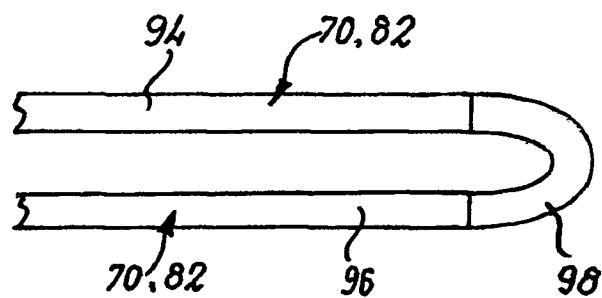
FIG. 13 is a fragmentary overhead view illustrating use of the use of one delivery tube for each pair of adjacent ducts.

A liquid delivery tube 82 may be arranged to feed the liquid to more than one duct 70. One such arrangement is illustrated in FIG. 13 in which pairs of ducts 70 are fed by a single U-shaped delivery tube 82 which has one leg 94 overlying and sealing the upper open end of one duct 70 and a parallel leg 96 overlying an adjacent duct 70, the legs 94 and 96 being interconnected by bight portions 98 and having their free ends dipping into the supply reservoir 86. The collector tubes 90 may be similarly configured so as to extend over more than one duct 70, e.g. a pair of adjacent ducts, and thereby collect liquid to the collector vessel 92. The bight portion 98 of the delivery or collector tube may provide continuity of wicking feed between the legs 94 and 96.

Figure 14:
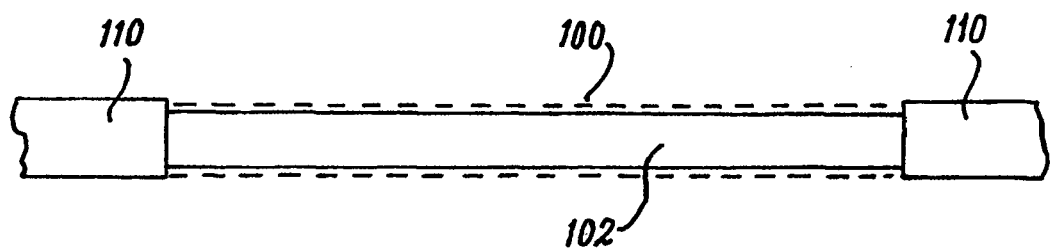
FIG. 14 is a view illustrating a delivery or collector tube provided with shrink tube fittings at the ends thereof.
Figure 15:
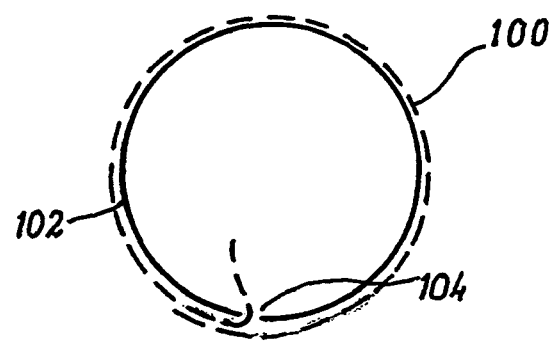
FIG. 15 is a sectional view showing one way of forming a tubular wicking structure for use as a delivery or collector tube in accordance with the invention.

The delivery tubes and/or the collection tubes 90 may advantageously be fabricated in the manner illustrated in FIGS. 14 and 15 in which a layer of wicking material 100, e.g. cotton fabric, is wrapped around a supporting tube 102 e.g. of a plastics material which is produced with a longitudinal slit 104 through which the wicking material can be inserted. The plastics material may be of a resilient nature such that the slit tends to be closed when the tube is unstressed but can be forced open for the purpose of inserting the wicking material. Inserting the wick into the split 104 maintains the gap when the wick is wrapped around the pipe and overlapping the wick at the gap ensures that the pipe is sealed from air when the wick is wet. The gap would for example be 0.1 mm if the wick were 0.1 mm thick and if the tube 102 were 12 mm in diameter, typically a suction of 1500 Pa could be supplied at one end of a 4 m long, dry pipe to draw water from a reservoir 150 mm below the pipe. The leakage of air into the tube through the dry wick would be insufficient to prevent the water from being drawn along the whole length of the wick. The tube 102 can then be filled with water and the wick wetted to feed the evaporating ducts 70. Since the arrangement may be such that the tube 102 is always below atmospheric pressure, this allows the whole system to be charged with water with no possibility of any drips forming. This is very important if the system is installed in situations where no interruption in the use of a room can be tolerated, such as a telephone exchange. One end of the tube 102 is dipped into the liquid supply reservoir while the opposite end may either be sealed (after filling) or dip into a pool of liquid which may be the supply reservoir 86 or another liquid reservoir which could be at a slightly lower level so as to induce flow through the tube 102 from the higher reservoir to the lower reservoir. Such an induced flow is not essential but may aid in checking that liquid flow is taking place (as observed via a transparent section of tubing) and it may serve to sweep away any gas bubbles that may arise from desorption from the liquid.

Air ingress into the delivery and/or collection tubes 82, 90 should be avoided for efficient operation. To provide wick sealing at the ends of the tubes 82, 90, heat shrink tubing 110 may be used as illustrated in FIG. 14 at those ends where the wicking tubes dip into the reservoirs 86, 92. Where the tubes 82, 90 are U-shaped as in the embodiment of FIG. 13, the bight portions 98 may be formed by tubing 110 linking the two legs 94, 96 of a wicking tube together.

The cooling system described herein is not limited in its use merely to buildings, but could also be used in vehicles such as cars, coaches, refrigerated lorries, ships, trains and aeroplanes and other enclosures where cooling may be required.

Whilst endeavouring in the foregoing specification to draw attention to those features of the invention believed to be of particular importance, it should be understood that the Applicant claims protection in respect of any patentable feature or combination of features disclosed herein and/or shown in the drawings whether or not particular emphasis has been placed on such feature or features. Moreover, it will be appreciated that certain features of the invention which are, for clarity, described in the context of separate embodiments, may also be provided in combination in a single embodiment. Conversely, various features of the invention which are, for brevity, described in the context of a single embodiment may also be provided separately or in any suitable sub-combination. For instance, while the feature of FIG. 6 (cross-sectional change) is not illustrated for the embodiment of FIG. 11 and variations thereof, it will be appreciated that this, and other features disclosed herein, are applicable to the embodiment of FIG. 11 and variations thereof

The invention claimed is:

1. A cooling unit forming an air flow channel for cooling an enclosed space, said cooling unit comprising a wall having internal and external faces, said external face at least partially defining said enclosed space to be cooled, with at least one opening for air to communicate between the internal face and the external face, a layer of wicking material for developing a layer of liquid on the internal face for exposure of the layer of liquid to and evaporation into air-flow from the external face into exhaust air coming from the enclosed space through the at least one opening to cause cooling of the external face of the wall, and a liquid supply reservoir arranged so that a liquid level is below the layer of wicking material, supply of liquid to the wicking material from the liquid supply reservoir being maintained by wicking action, the wicking material comprising a number of discrete sections.

2. The unit as claimed in claim 1, wherein at least some of the discrete sections share at least one of a common liquid feed and a collector.

3. A cooling unit comprising a duct forming an air-flow passageway having an internal surface and an external surface thereof with at least one opening for air to communicate between the internal surface and the external surface and provided with a layer of wicking material by which a layer of liquid in contact with said internal surface is developed and from which evaporation is induced by air flow through the duct from the external surface, and a liquid supply reservoir arranged so that the liquid level is below the layer of wicking material, supply of liquid to the wicking material from the liquid supply reservoir being maintained by wicking action, the duct including a liquid delivery wicking element for supply of liquid to one edge of the layer of wicking material, the duct including a member of U-section, an open side of which being closed by the liquid delivery wicking element.

4. The unit as claimed in claim 3, wherein said element comprises a tube of wicking material.

5. The unit as claimed in claim 4, wherein the tube of wicking material is provided on a supporting tube.

6. The unit as claimed in claim 5, wherein the wicking material is wrapped around the supporting tube and inserted through a slit in the supporting tube.

7. The unit as claimed in claim 6, wherein the supporting tube is at least partially filled with liquid for supply to the wicking material.

8. A cooling unit comprising a duct forming an air-flow passageway having an internal surface and an external surface thereof with at least one opening for air to communicate between the internal surface and the external surface and provided with a layer of wicking material by which a layer of liquid in contact with said internal surface is developed and from which evaporation is induced by air flow through the duct from the external surface, and a liquid supply reservoir arranged so that the liquid level is below the layer of wicking material, supply of liquid to the wicking material from the liquid supply reservoir being maintained by wicking action, the duct being provided with a liquid collecting wicking element for conducting liquid from the wicking material on said internal surface to a liquid collection point.

9. A cooling unit comprising a duct forming an air-flow passageway having an internal surface and an external surface thereof with at least one opening for air to communicate between the internal surface and the external surface and provided with a layer of wicking material by which a layer of liquid in contact with said internal surface is developed and from which evaporation is induced by air flow through the duct from the external surface, a liquid supply reservoir arranged so that the liquid level is below the layer of wicking material, supply of liquid to the wicking material from the liquid supply reservoir being maintained by wicking action, and a cross-sectional area of a path of the air flow varying in a direction of air flow.

10. The unit as claimed in claim 9, wherein the cross-sectional area of the air flow path is progressively reduced in the downstream direction of air flow.

11. A system for use in cooling an enclosed space, said system comprising a plurality of units each having a duct forming an air flow passageway having an internal surface and an external surface thereof with at least one opening for air to communicate between the internal surface and the external surface and provided with a layer of wicking material by which a layer of liquid in contact with said internal surface is developed and from which evaporation is induced by air flow through the duct from the external surface, the units being arranged to conduct air flow in at least one of serial and parallel fashion, a liquid supply reservoir arranged so that the liquid level is below the layer of wicking material, supply of liquid to the wicking material from the supply reservoir being maintained by wicking action, and a chamber for producing a flow of air through the duct, the chamber for producing the air flow being a plenum chamber or chambers into which air removed from the enclosed space is passed for discharge externally of the enclosed space.

12. A cooling system for an enclosed space, said cooling system comprising:

a surface structure exposed to air within the enclosed space, a layer of wicking material developing a layer of liquid on a remote face of the surface structure remote from the space, a device exhausting air from the surface structure exposed to air within the enclosed space and passing the exhausted air over said remote face remote from the space so that, in use, the exhaust air effects evaporation of liquid from said layer through the surface structure into the air flow, and a liquid supply reservoir arranged so that a liquid level is below the layer of wicking material, supply of liquid to the wicking material from the liquid supply reservoir being maintained by wicking action.

13. The system as claimed in claim 12, wherein the surface structure comprises a plurality of units having a duct forming an air-flow passageway having an internal surface or surfaces thereof provided with the layer of wicking material by which a layer of liquid in contact with said internal surface is developed and from which evaporation is induced by air flow through the duct and the plurality of units are arranged in at least one of serial fashion and parallel side by side fashion.

14. The system as claimed in claim 13, wherein the units are of elongated configuration.

15. The system as claimed in claim 13, wherein each unit includes a further surface in spaced, opposed relation to said remote face to form an air flow path across said remote face.

16. The system as claimed in claim 13, wherein the internal face of each cooling unit is provided with the layer of wicking material and at least some of the cooling units are interconnected so that liquid flow is conducted from the layer of wicking material of one unit to the layer of wicking material of the next unit.

17. The system as claimed in claim 13, further comprising a chamber for discharge of air after passage over the liquid layer and the chambers of at least some of the units are interconnected to form an air discharge duct.

18. A method of cooling an enclosed space by contacting air with said space with at least one surface structure, said method comprising the steps of:
feeding liquid to a layer of wicking material so as to develop a layer of liquid on a surface of said structure which is remote from said space; and
removing air from the space and contacting the air removed from the space with the liquid layer remote from the space so that evaporation of liquid from the liquid layer into the air flow is secured thereby cooling said structure and hence the space bounded thereby, the liquid being fed to the layer of wicking material from a liquid supply reservoir arranged so that the liquid level is below the layer of wicking material, supply of liquid to the wicking layer from the supply reservoir being maintained by wicking action.

19. The method of claim 18, wherein the liquid includes an additive to inhibit microbial growth.

20. The method of claim 18, wherein sea water is used as the liquid and vapor entrained in the air flow is collected and condensed for use as fresh water.

* * * * *